(12) United States Patent
Sako et al.

(10) Patent No.: US 6,728,174 B1
(45) Date of Patent: Apr. 27, 2004

(54) RECORDING MEDIUM AND REPRODUCING METHOD AND APPARATUS FOR RECORDING MEDIUM

(75) Inventors: Yoichiro Sako, Tokyo (JP); Hiroshi Ogawa, Kanagawa (JP); Tatsuya Inokuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 268 days.

(21) Appl. No.: 09/639,300

(22) Filed: Aug. 14, 2000

(30) Foreign Application Priority Data

Aug. 18, 1999 (JP) .......................... P11-232052

(51) Int. Cl.[7] .................. G11B 20/12; G11B 20/10; G11B 7/005; G11B 7/24
(52) U.S. Cl. .................. 369/47.1; 369/47.16; 369/94
(58) Field of Search .................. 369/275.3, 47.12, 369/59.25, 94, 47.54, 13.34, 30.09, 84, 95, 47.14, 47.16; 711/4.1, 112; 386/98; 380/3, 4, 5, 201; 360/27, 60; 341/144

(56) References Cited

U.S. PATENT DOCUMENTS

| | | | | |
|---|---|---|---|---|
| 5,010,417 A | * | 4/1991 | Yoshio et al. .................. 386/98 |
| 5,124,963 A | * | 6/1992 | Ando ...................... 369/30.09 |
| 5,291,462 A | * | 3/1994 | Richards .................. 369/13.34 |
| 5,295,126 A | * | 3/1994 | Okano et al. ............. 369/47.54 |
| 5,737,287 A | | 4/1998 | Lee .......................... 369/44.26 |
| 5,802,174 A | * | 9/1998 | Sako et al. .................. 380/201 |
| 5,878,020 A | * | 3/1999 | Takahashi ................. 369/59.25 |
| 5,966,721 A | * | 10/1999 | Hirayama et al. .............. 711/4 |
| 6,072,759 A | * | 6/2000 | Maeda et al. ............. 369/59.25 |
| 6,269,065 B1 | * | 7/2001 | Ogura et al. ................... 369/94 |
| 6,304,200 B1 | * | 10/2001 | Masuda ....................... 341/144 |

FOREIGN PATENT DOCUMENTS

| | | | |
|---|---|---|---|
| EP | 0729153 | 8/1996 | ........... G11B/27/32 |
| EP | 0817195 | 1/1998 | ........... G11B/27/32 |

* cited by examiner

*Primary Examiner*—William Korzuch
*Assistant Examiner*—Kim-Kwok Chu
(74) *Attorney, Agent, or Firm*—Jay H. Maioli

(57) ABSTRACT

A recording medium at least having a first recording layer for recording first information and a second recording layer for recording second information. A discriminating signal indicating the playback mode is recorded on at least one of the first and second recording layers provided on the recording medium. The discriminating signal indicates a first playback mode for respectively reproducing the first information recorded in the first recording layer and the second information recorded on the second recording layer, or a second playback mode for calculating the first information recorded in the first recording layer and the second information recorded in the second recording layer to generate playback signals. A reproducing method and apparatus for the recording medium are also provided for reproducing the recording medium.

31 Claims, 10 Drawing Sheets

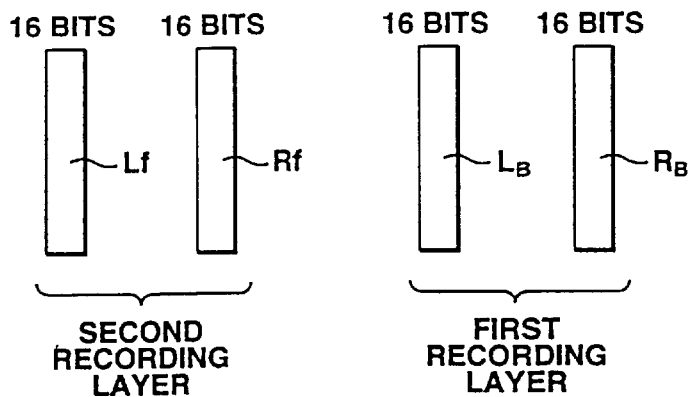
FIG.5A  FIG.5B
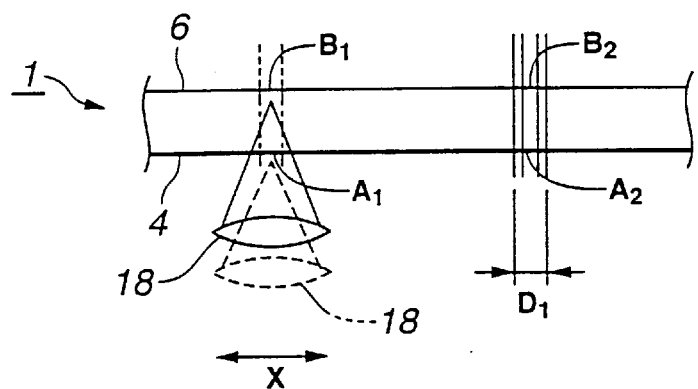
FIG.6
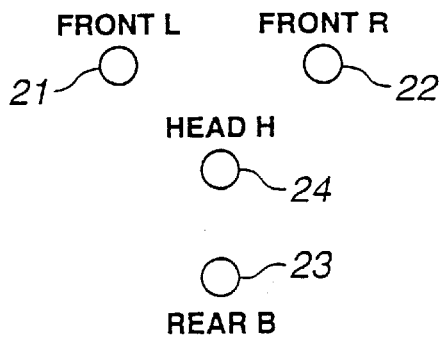
FIG.7

RECORDING MEDIUM AND REPRODUCING METHOD AND APPARATUS FOR RECORDING MEDIUM

BACKGROUND OF THE INVENTION

1. Field of the Invention

This invention relates to a recording medium, a reproducing method and apparatus for reproducing the recording medium, and an optical recording medium. More particularly, it relates to a recording medium, a reproducing method and apparatus for reproducing the recording medium, and an optical recording medium, in which the medium has at least first and second recording layers.

2. Background of the Invention

As a recording medium for variable information, such as the audio or video information, there is widely used an optical disc for reproducing the information recorded on the recording medium using a light bean. Such an optical disc has been proposed in which plural recording layers are provided for increasing the volume of the recordable information.

In a routine optical disc having plural recording layers, the information is recorded on each recording layer so that the information recorded on the respective recording layer is sequentially reproduced from one recording layer to another. That is, in this optical disc, the information recorded in the respective recording layers is reproduced by reproducing the information recorded on one recording layer after reproducing the information recording on another recording layer.

Alternatively, one of plural sectors provided on a recording layer of an optical disc is reproduced after reproducing another sector.

It may be seen that, in the routine multi-layered optical disc, in which the recording capacity is increased by providing plural recording layers, the information recorded in the respective recording layers is reproduced without pertinence to one another. So, the information recorded in the respective recording layers is simply reproduced as the information has been recorded in the respective recording layers

SUMMARY OF THE INVENTION

It is therefore an object of the present invention to provide a recording medium which resolves the above-mentioned problem.

It is another object of the present invention to provide a reproducing apparatus which resolves the above-mentioned problem.

It is still another object of the present invention to provide a reproducing method which resolves the above-mentioned problem.

It is yet another object of the present invention to provide an optical recording medium which resolves the above-mentioned problem.

According to the present invention, there is provided a recording medium at least having a first recording layer for recording the first information and a second recording layer for recording the second information. A discriminating signal indicating the playback mode is recorded on at least one of the first and second recording layers.

According to the present invention, there is also provided a recording medium at least having a first recording layer for recording the first information and a second recording layer for recording the second information. A discriminating signal representing a playback mode is recorded in the first or second recording layer read out first at the time of reproduction.

According to the present invention, there is provided a reproducing apparatus for a recording medium. The recording medium includes at least a first recording layer in which the first information is recorded, and a second recording layer in which the second information is recorded. In at least one of the first recording layer and the second recording layer, there is recorded a discriminating signal at least indicating whether or not the first information recorded in the first recording layer and the second information recorded in the second recording layer are to be calculated and reproduced. The reproducing apparatus includes a readout unit, a reproducing processing unit and a controller. The readout unit reads out the first or second information from the recording medium. The reproducing processing unit applies signal processing to an output signal from the readout unit. The controller switches the reproduction processing unit based on the discriminating signal read out by the readout unit.

According to the present invention, there is provided a reproducing method for reproducing a recording medium. The recording medium includes at least a first recording layer in which the first information is recorded, and a second recording layer in which the second information is recorded. In at least one of the first recording layer and the second recording layer, there is recorded a discriminating signal at least indicating whether or not the first information recorded in the first recording layer and the second information recorded in the second recording layer are to be calculated and reproduced. The reproducing method reads out the first or second information from the recording medium and, based on the discriminating signal read out from the recording medium, switches the reproduction processing operation of the reproduction processing means fed with the first and second information read out from the recording medium based on the discriminating signal read out from the recording medium.

According to the present invention, there is also provided an optical recording medium including at least a first recording layer in which the first information is recorded and a second recording in which the second information is recorded. The first and second information are recorded so as to be accessed by movement within a field of view of the objective lens used for reading out the first and second information.

BRIEF DESCRIPTION OF THE DRAWINGS

FIG. 5 shows a data structure of the first and second information recorded on the first and second recording layers of the optical disc.

FIG. 6 schematically shows the state of recording of the first and second information on the first and second recording layers of the optical disc.

FIG. 7 shows another typical arrangement of speakers fed with playback signals of the information recorded on an optical disc according to the present invention.

DESCRIPTION OF THE PREFERRED EMBODIMENTS

Figure 1:
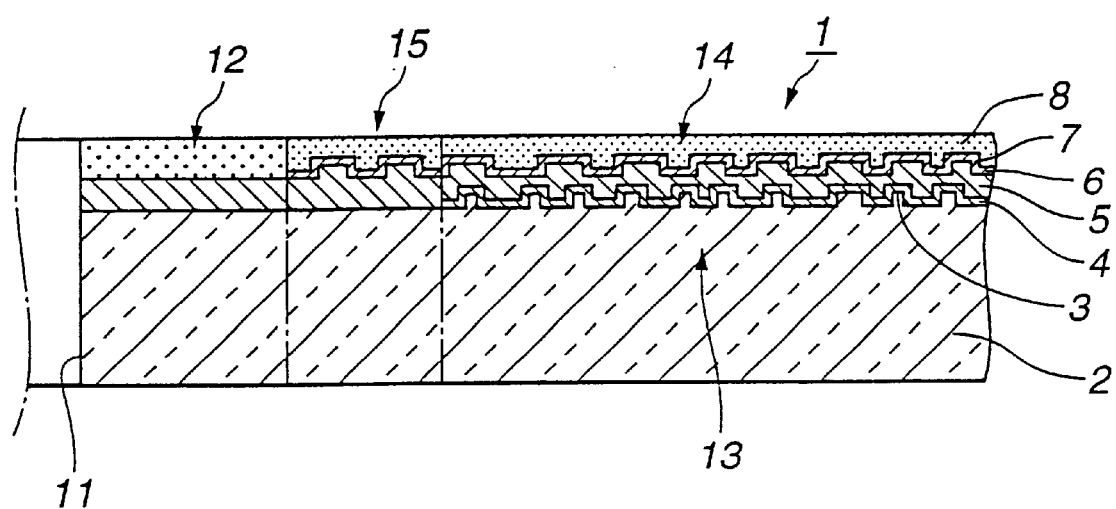
FIG. 1 is a cross-sectional view showing an example of an optical disc according to the present invention.

Referring to the drawings, preferred embodiments of according to the present invention will be explained in detail.

An optical disc 1 according to the present invention includes a substrate 2 formed of a synthetic resin, such as light-transmitting polycarbonate resin, or glass, as shown in FIG. 1. On one of the major surfaces of the substrate 2, there is provided a pit pattern 3, which is a pattern of fine crests and recesses corresponding to the audio or video information, as the first information to be recorded. If the substrate 2 is formed of a synthetic resin, the pit pattern 3 is formed simultaneously as the substrate 2 when injection molding the substrate 2. If the substrate 2 is formed of glass, it is formed using a 2P (photo-polymerization method). In the 2P method, a photo-curable resin, such as UV light curable resin, is charged into a space between the glass substrate and a disc stamper, and the photocurable resin is cured on illumination of, for example, UV rays, from the glass substrate side to produce a layer presenting a pattern of crests and recesses on the glass substrate.

The substrate 2, used for this optical disc 1, is obtained on injection molding a polycarbonate resin. On one major surface of the substrate 2 is recorded the recording information in the form of the pit pattern 3. Similarly to the substrate of the compact disc, which is a routinely used optical disc with a diameter of 12 cm, the substrate 2 is of a thickness of approximately 1.2 mm.

On one of the major surfaces of the substrate 2, carrying the pit pattern 3, there is provided a first recording layer 4 extending along the pit pattern 3, as shown in FIG. 1. The first recording layer 4 is formed as a semi-transparent film transmitting a certain quantity of a light beam illuminated from the substrate 2 and reflecting a certain quantity thereof, and is formed of silicon-based material, such as $Si_3O_4$ or $SiO_2$, to a thickness of the order of 100 nm to 500 mn. The first recording layer 4 is formed as a multiple layer by layering $Si_3O_4$ or $SiO_2$ films. The $Si_3O_4$ film or the $SiO_2$ film, making up the first recording layer 4, is formed by a vacuum deposition or sputtering method.

On the first recording layer 4 is formed a second recording layer 6 via an intermediate layer 5 of, for example, a UV light curable resin. The intermediate layer 5 plays the role of optically separating the first recording layer 4 and the second recording layer 6 so that these layers 4, 6 are not positioned within the depth of focus of an objective lens 6 converging and illuminating a light beam on these layers 4, 6. Specifically, the intermediate layer 5 is of a thickness of approximately 30 $\mu$m. If the intermediate layer 5 is too thin in thickness, the reflected light beams from the first recording layer 4 cannot be separated sufficiently from the reflected light beams from the second recording layer 6 to render it difficult to detect the two reflected beams. On the other hand, if the intermediate layer 5 is too thick, spherical aberration, for example, is produced. The thickness of the intermediate layer 5 is set to a proper value taking these respects into consideration.

The intermediate layer 5 is formed by spin coating a UV light curable resin. Alternatively, the UV light curable resin, for example, may be coated by several coating operations with a coating thickness for each coating operation being 5 to 10$\mu$m. The intermediate layer 5 may also be formed by bonding a transparent sheet 22.

On one of the major surfaces of the intermediate layer 5 is formed a pit pattern 7 which is a pattern of fine crests and recesses corresponding to the audio or video information recorded on the second recording layer 6 as the second information. This pit pattern 7 may be formed by the 2P method used in forming a pit pattern on a glass substrate. That is, a UV light curable resin is applied to the first recording layer 4 by a spin coating method, a stamper carrying crests and recesses corresponding to the pit pattern 7 is applied to the resulting assembly, and UV rays are illuminated in this state on the resulting assembly to cure the resin. The stamper then is exfoliated to form the pit pattern 7 on one of the major surfaces of the intermediate layer 5.

The second recording layer 6 is formed along the pit pattern 7 formed on one of the major surfaces of the intermediate layer 5 to overlie the pit pattern 7. For reflecting the light beam illuminated through the first recording layer 4 on the second recording layer 6 to an optical pickup lying on the side substrate 2 to high efficiency, the second recording layer 6 is formed of a material which assures high reflectance, such as aluminum (Al), gold (Au) or silver (Ag), by a technique such as vapor deposition or sputtering. For protecting the surface of the second recording layer 6, a protective layer 8 of, for example, UV light curable resin, is provided on the second recording layer 6. This protective layer 8 is formed by coating the UV light curable resin on the second recording layer 6 by a spin-coating method and by illuminating the UV rays on the resulting assembly for curing.

Figure 2:
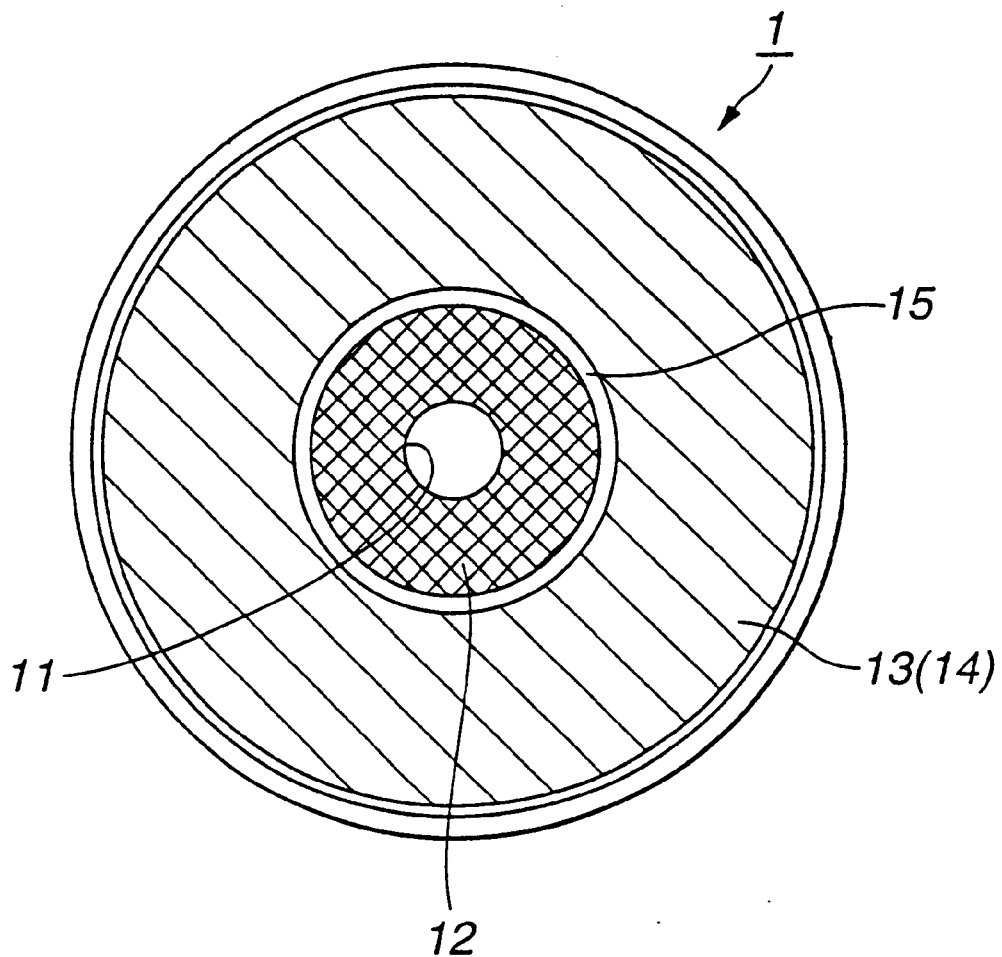
FIG. 2 is a plan view of the optical disc.
Figure 3:
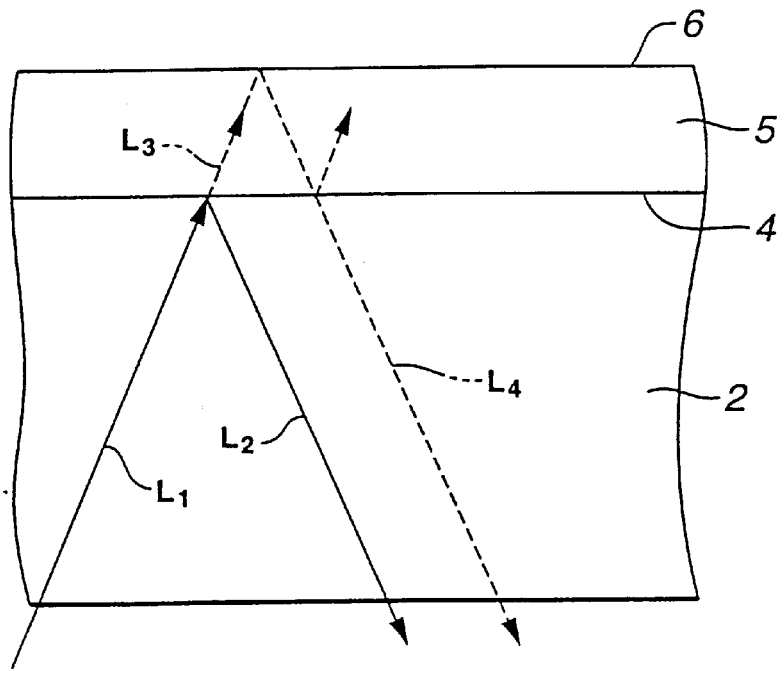
FIG. 3 shows a state in which a light beam is illuminated on first and second recording layers provided on the optical disc.

The optical disc 1 has a center opening 11, around which there is provided a clamping area 12, as shown in FIG. 2. This optical disc 1 is loaded on a disc table of a disc rotating driving unit provided on the optical disc reproducing apparatus, for rotation in unison with the disc table, as the optical disc is centered with respect to the disc table, by forming a centering portion centrally of the disc table in the center opening 11, setting the clamping area 12 on the disc table and clamping the optical disc in position by a clamping member, not shown.

Since the optical disc 1 is provided in its inner rim area with the clamping area 12 clamped by the disc rotating driving unit, the first and second recording layers 4 and 6 are provided radially outwardly of the outer rim of the clamping area 12.

Meanwhile, the first and second information, recorded on the first and second recording layers 4 and 6 of the optical disc 1, are reproduced by illuminating a light beam from the side of the substrate 2 and by detecting the return light beam reflected from the first and second recording layers 4 and 6 by a photodetector, not shown, provided on the side substrate 2. To this end, the first recording layer 4 is formed as a semi-transparent film permitting a certain portion of the light beam to be transmitted towards the second recording layer 6, whereas the second recording layer 6 is designed to reflect the light beam transmitted through the first recording layer 4 so as to be illuminated on the second recording layer 6 at a high efficiency. That is, the reflectance of the second recording layer 6 is selected to be higher than that of the first recording layer 4.

More specifically, the first recording layer 4 of the optical disc 1 according to the present invention has a reflectance of 11%, whereas that of the second recording layer 6 has a reflectance of 99%. If the light beam diffusion absorption ratio of the substrate 2 formed of a polycarbonate resin is 5%, and a light beam $L_1$ falls on the side substrate 2, 10% of the light beam is reflected by the first recording layer 4 as a return light beam $L_2$, with 85% of the light beam being transmitted through the first recording layer 4 to fall on the second recording layer 6. Since the light beam diffusion absorption ratio of the intermediate layer 5 is approximately zero, the major portion of the light beam falls on the second recording layer 6. A light beam $L_3$, incident on the second recording layer 6, is reflected by the second recording layer 6 having the reflectance of 99%, to prove a return light beam $L_4$, which is transmitted through the first recording layer 4 having the reflectance of 11% and through the substrate 2 with the diffusion and absorption ratio of 5%, so as to be outputted to outside of the optical disc 1. The return light ratio of the beam $L_4$, reflected by the second recording layer 6, is approximately 71% of the amount of the light beam $L_1$ first incident on the substrate 2.

As another example of the optical disc 1, if the reflectance of the first recording layer 4 is 20% and that of the second recording layer 6 is 99%, 18% of the light beam $L_1$ incident initially on the substrate 2 from the second recording layer 6 is reflected as a return light beam $L_2$, whilst approximately 57% of the light beam $L_1$ incident initially on the substrate 2 from the second recording layer 6 is reflected as the return light beam.

By reducing the reflectance of the first recording layer 4 and raising the light transmittance to increase the reflectance of the second recording layer 6, in this manner, it is possible to provide a sufficient light volume of the return light beam reflected back from the second recording layer 6. The second information, recorded on an information recording area 14 of the second recording layer 6 having the high reflectance, can be reproduced sufficiently by a routine optical disc reproducing apparatus for which high reflectance is a requirement. That is, the second recording layer 6 can be handled as is the routinely employed compact disc (CD).

Meanwhile, the audio information corresponding to respective independent music numbers may be recorded as the first and second information on the first and second recording layers 4 and 6 of the optical disc 1. In such case, the audio information corresponding to an independent music number is recorded as the second information on the second recording layer 6 which can be handled similarly to the routinely used CD, whilst the information on a new musical number targeted at advertisement or marketing is recorded as the first information on the first recording layer 4.

On the first and second recording layers 4 and 6, there may also be recorded the first and second information which are relevant to each other. In such case, the first and second information constitute together the sole unitary recording information typified by, for example, the multi-channel audio information enabling surround reproduction.

Figure 4:
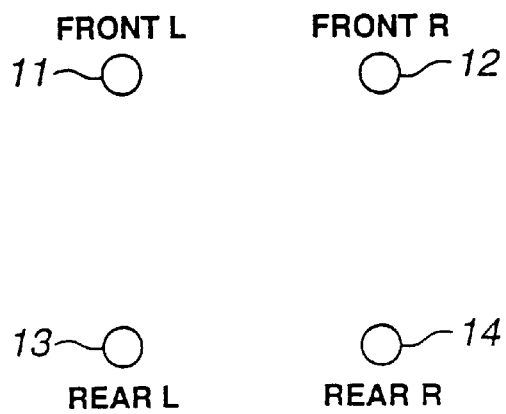
FIG. 4 shows a typical arrangement of speakers fed with playback signals of the information recorded on an optical disc according to the present invention.
Figure 8:
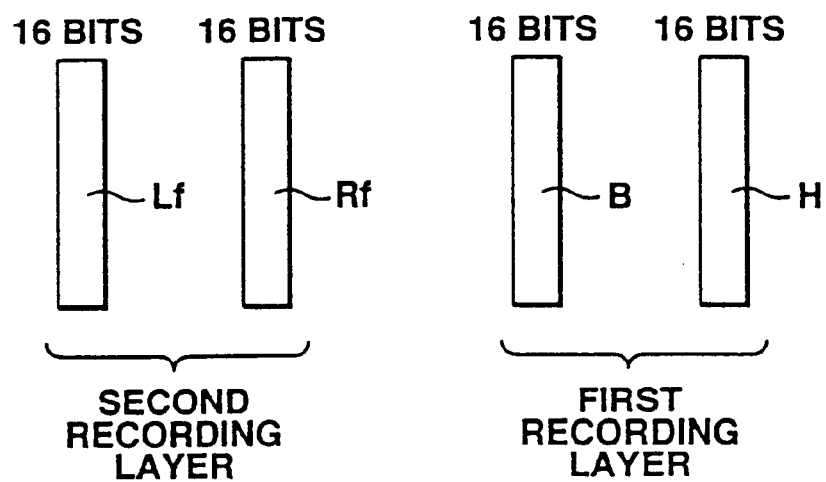
FIG. 8 shows another data structure of the first and second information recorded on the first and second recording layers of the optical disc.

The multi-channel audio information is made up of, for example, left and right front channel data, inputted to left and right front speakers 11, 12, arranged on the forward side of an acoustic space, and left and right rear channel data, inputted to left and right front speakers 13, 14, as shown in FIG. 4.

It is noted that the left and right front channel information is recorded as the second information on the second recording layer 6, whilst the left and right rear channel information is recorded as the first information on the first recording layer 4.

The left and right front channel information $L_f$, $R_f$, recorded as the second information in the second recording layer 6, is quantized as 16-bit information for each of the left and right channel information, as shown in FIG. 5A. The left and right rear channel information $L_B$, $R_B$, recorded as the second information in the first recording layer 4, is similarly quantized as 16-bit information for each of the left and right channel information, as shown in FIG. 5B.

The first information recorded on the first recording layer 4 is recorded at $B_1$, $B_2$, . . . of the second recording layer 6 in the vicinity of $A_1$, $A_2$, . . . of the first recording layer 4, on which is recorded the first information pertinent to the second information, as shown in FIG. 6. In particular, the second information is recorded within a distance $D_1$ from the positions $A_1$, $A_2$ of the first recording layer 4, carrying the recorded first information pertinent to this second information. This distance $D_1$ is such a distance that can be accessed by moving an objective lens 18 of the optical pickup of a readout mechanism adapted for reading out the first or second information of the first and second recording layers 4 and 6 of the optical disc 1 in the direction substantially perpendicular to the recording track formed in the first and second recording layers 4 and 6, as indicated by arrow X in FIG. 6. This distance $D_1$ is such a distance that can be accessed by the movement of the optical pickup within he field of view of the objective lens 18 without performing sled feed of feeding the optical pickup by a pickup feed mechanism, not shown, in a direction perpendicular to the recording track, that is along the radius of the optical disc 1. Specifically, this distance $D_1$ is of the order of approximately 200 μm. More specifically, the first and second information are recorded on the respective recording layers so that the leading end of an area in which is recorded the first information and the leading end of an area in which is recorded the second information are within a range of approximately 200 μm from each other. For example, if the recording is made in the first and second recording layers 4 and 6 in accordance with the standard CD recording format, and the distance $D_1$ of the recording positions of the first and second information is 100 μm, the first and second information are recorded within 60 recording tracks extending concentrically or spirally in the first and second recording layers 4 and 6.

The first and second information, relevant with each other to constitute the sole unitary recording information, may also be recorded on the first and second recording layers 4 and 6.

For example, if the audio information recorded on the optical disc 1 is a multi-channel data, made up of left and right front channel data $L_f$, $R_f$ inputted to left and right front speakers 21, 22 arranged on the front side of an acoustic space, rear channel data B, inputted to a rear speaker 23, arranged on the rear side, and overhead channel data H, inputted to an upper speaker 24, arranged over the user's head, as shown in FIG. 7, the front channel data $L_f$, $R_f$ are recorded as the second information in the second recording layer 6, whilst the rear channel data B and the overhead channel data H are recorded as the first information on the second recording layer 6.

If the multi-channel data is recorded divisionally in the first and second recording layers 4 and 6, and only the second information recorded on the second recording layer 6 is reproduced, stereo playback is realized using the left and right front speakers 21, 22. On the other hand, if the first and second information, recorded on the first and second recording layers 4 and 6, are synthesized and reproduced, multi-channel stereo playback may be realized using the left and right front speakers 21, 22, rear speaker 23 and the upper speaker 24.

Figure 9:
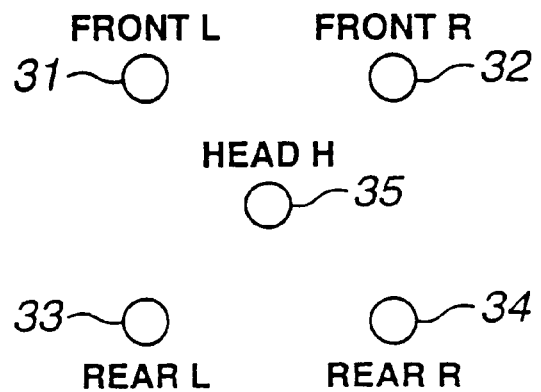
FIG. 9 shows another typical arrangement of speakers fed with playback signals of the information recorded on an optical disc according to the present invention.
Figure 10:
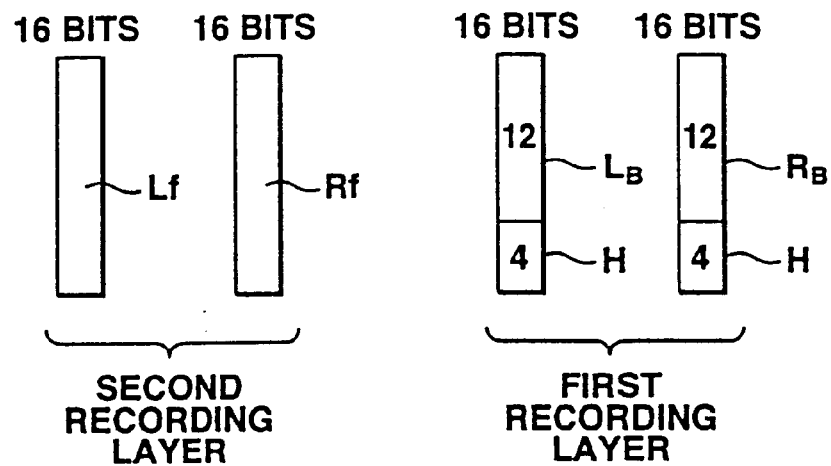
FIG. 10 shows another data structure of the first and second information recorded on the first and second recording layers of the optical disc.
Figure 11:
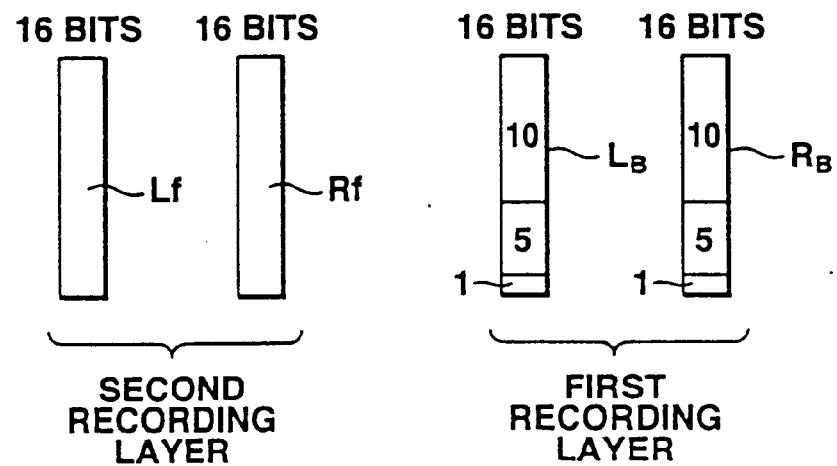
FIG. 11 shows another data structure of the first and second information recorded on the first and second recording layers of the optical disc.

Moreover, if the audio information recorded on the optical disc 1 is the multichannel data, made up of the left and right front channel data $L_f$, $R_f$, inputted to the left and right front speakers 31, 32, arranged towards the front side of an acoustic space, rear channel data $L_B$, $R_B$, inputted to the left and right rear speakers 33, 34, arranged towards its rear side, and the upper channel data H, inputted to the upper speaker 24, arranged over the head, as shown in FIG. 9, the front channel data $L_f$, $R_f$ are recorded on the second recording layer 6 as the second information, whereas the rear channel data $L_B$, $R_B$ and the upper channel data H are recorded on the first recording layer 4 as the first information. The recording is made so that upper 12 bits of the second information, as the 16-bit quantizing data of the left and right channels, recorded on the first recording layer 4, will be used as rear channel data $L_B$, $R_B$, and so that lower 4 bits will be used as upper channel data H.

Moreover, 16-bit front channel data $L_f$, $R_f$ are recorded as the second information on the second recording layer 6, whereas the first information, comprised of left and right 16-bit channel data, is recorded on the first recording layer 4 so that upper 10 bits, mid 5 bits and the lower 1 bit are used as rear channel data $L_B$, $R_B$, as audio signal data of the mid frequency range and as audio signal data of the low frequency range, respectively.

In addition, odd samples and even samples of data, such as audio data quantized to 16 or 32 bits, are recorded on the first and second recording layers 4 and 6, as the first and second information, respectively.

For recording the first and second information, as described above, the first and second information are recorded within a range accessible by movement in the field of view of the objective lens 18, as shown in FIG. 6.

By divisionally recording the plural information relevant to one another to make up a unit of the recording information on the first and second recording layers 4 and 6 or on three or more recording layers, it is possible not only to increase the recording capacity per optical disc 1, but also to reproduce the variegated information.

There are a wide variety of the information, in addition to that described above, as the first and second information recorded on the first and second recording layers 4 and 6.

If, when the second information is upper bits of the quantized data, the first information is the lower bits of the quantized data and the second information is the audio information, the first information is the text data, such as the lyric, or picture data, pertinent to this audio information, and the second information is picture data, the first information my be recorded as a title or synopsis pertinent to these picture data.

On the first recording layer 4, there is recorded the audio information corresponding to the accompaniment music separated from a complete musical number made up of the lyric and the accompaniment music, as the first information, whereas, on the second recording layer 6, there is recorded the audio information comprising a complete musical number made up of the lyric and the accompaniment music in their entirety, as the second information.

The audio information may be recorded in various different forms on the first and second recording layers 4 and 6, such that the audio information corresponding to the accompaniment music separated from a complete musical number made up of a lyric and the accompaniment music is recorded on the first recording layer 4, whereas the audio information corresponding to the lyric is recorded on the second recording layer 6, as the second information.

In a musical piece, such as orchestra, performed by plural musical instruments, the audio information corresponding to the portion of the orchestra performed by a piano is recorded on the first recording layer 4 as the first information, whereas the audio information comprising the entire orchestra is recorded on the second recording layer 6 as the second information.

Meanwhile, the second recording layer 6, layered on the first recording layer 4, is provided for extending to close to the clamping area 12 which is closer than the first recording layer 4 to the inner rim side of the disc 1, as shown in FIG. 1. The inner rim side area of the second recording layer 6, not facing the first recording layer 4, is provided with a lead-in area 15 having recorded therein at least a portion of control data read out prior to reproduction of the first and second information previously recorded on the information recording areas 13, 14 of the first and second recording layers 4 and 6 when the optical disc 1 is loaded on the optical disc reproducing apparatus. The control data, recorded in this lead-in area 15, may be enumerated by control data for controlling the light beam focussing position for the second recording layer, as a portion of the data necessary for reading out the data recorded on the second recording layer 6, data for light beam tracking control, and data for controlling the light beam tracking position for the first recording layer 4, as a portion of the data necessary for reading out the data recorded on the first recording layer 4.

In the lead-in area 15, the archival information, stating the contents of the second information recorded on the information recording area 14 of the second recording layer 6, is also recorded.

In the lead-in area 15, there is also recorded a discriminating signal representing the playback mode of the first and second information recorded on the first and second recording layers 4 and 6. If the audio information corresponding to respective independent musical numbers is recorded as the first and second information on the first and second recording layers 4 and 6, signals controlling the reproduction apparatus for respectively outputting the first and second information are recorded as the discriminating signal representing the playback mode.

If the first and second information, relevant to one another to make up a unit of the recording information, are recorded on the first and second recording layers 4 and 6, discriminating signals controlling a reproducing unit of the reproduced apparatus for processing and outputting the first and second information is recorded.

Similarly to the first and second information, recorded on the information recording areas 13 and, 14, control data including the discriminating signal recorded on the lead-in area 15 and the archival information are also recorded by a pit pattern 7 comprising a fine pattern of crests and recesses.

The lead-in area 15 is provided only in the second recording layer 6 of the optical disc 1, so that, when the optical disc 1 is loaded on the optical disc reproduction apparatus, the first and second information, recorded on the first and second recording layers 4 or 6, are reproduced after reading out the control data, such as the archival information, including the discriminating signal recorded on the lead-in area 15 provided on the recording layer 6.

Meanwhile, the lead-in area 15 is provided in an area that can be scanned by a light beam radiated from an optical pickup provided on the optical disc reproducing apparatus when the optical disc 1 is loaded on the optical disc reproducing apparatus.

Since the second recording layer 6 is provided in the inventive optical disc 1 for extending more radially inwardly of the disc than the first recording layer 4, and the lead-in area 15 is provided in this radially inwardly extended portion, the first recording layer 4 is provided radially outwardly of the lead-in area 15. Since the portion of the optical disc 1 provided with the lead-in area 15 of the second recording layer 6 is not provided with a light beam reflecting layer, beginning from the substrate 2, on which falls the light beam, up to the second recording layer 6, the light beam incident on the second recording layer 6 so as to be reflected by the second recording layer 6 can be detected without attenuation by the first recording layer 4, so that the control data recorded on the lead-in area 15 can be read out to high precision.

Moreover, when reading out the control data, recorded in the lead-in area 15 provided in the second recording layer 6, such as the archival information, inclusive of the discriminating signal, it is possible to eliminate the light beam reflected by the first recording layer 4, so that there is no risk of the light beam component reflected by the first recording layer 4 being superposed as noise component on the light beam reflected by the second recording layer 6, thus assuring correct readout.

In the lead-in area 15, data pertinent to the reflectance of the second recording layer 6 is recorded as control data read out prior to reproduction of the first and second information previously recorded in the information recording areas 13, 14 of the first and second recording layers 4 and 6. By recording the data pertinent to the reflectance of the first recording layer 4 in the lead-in area 15, the first information recorded in the second recording layer 6 can be read out correctly, such as by previously switching the gain of the amplification circuit when reading out the second information recorded in the first recording layer 4, in a case wherein the reflectance of the first recording layer 4 is lower than that of the second recording layer 6.

By recording data indicating that the second recording layer 6 is provided in addition to the second recording layer 6 in the lead-in area 15, it can be discriminated, on loading the optical disc in the optical disc reproducing apparatus, that the optical disc loaded is the multi-layered optical disc 1. If, on loading an optical disc on an optical disc reproducing apparatus, it can be recognized to be an optical disc 1 provided with the first recording layer 4, it is possible for the reproducing apparatus to select a playback mode of reproducing the optical disc provided with the first and second recording layers 4 and 6 to proceed to reproduction of the first and second information recorded on the first and second recording layers 4 and 6.

In the above-described optical disc 1, the reflectance of the second recording layer 6, expressed as the ratio of the return light beam to the incident light beam, is higher than that of the first recording layer 4. However, the return light beam may be larger in light volume than that of the second recording layer 6. For example, if the reflectance of the first recording layer 4 is 60%, that of the second recording layer 6 is 99%, the component reflected by the surface of the substrate 2 is 6% and there is no light beam absorption of the light beam by the intermediate layer 5, approximately 54% of the light beam from the first recording layer proves the return light beam, whilst approximately 15% of the light beam from the second recording layer 6 proves the return light beam.

Even if the first and second recording layers 4 and 6 are formed with the above-described reflectance ratio, the first recording layer 4 is not provided in an area corresponding to the lead-in area 15 provided in the second recording layer 6, so that control data recorded in the lead-in area 15 can be read out at a high reflectance without adverse effects from the first recording layer 4 having a high reflectance and a low light transmittance.

Figure 12:
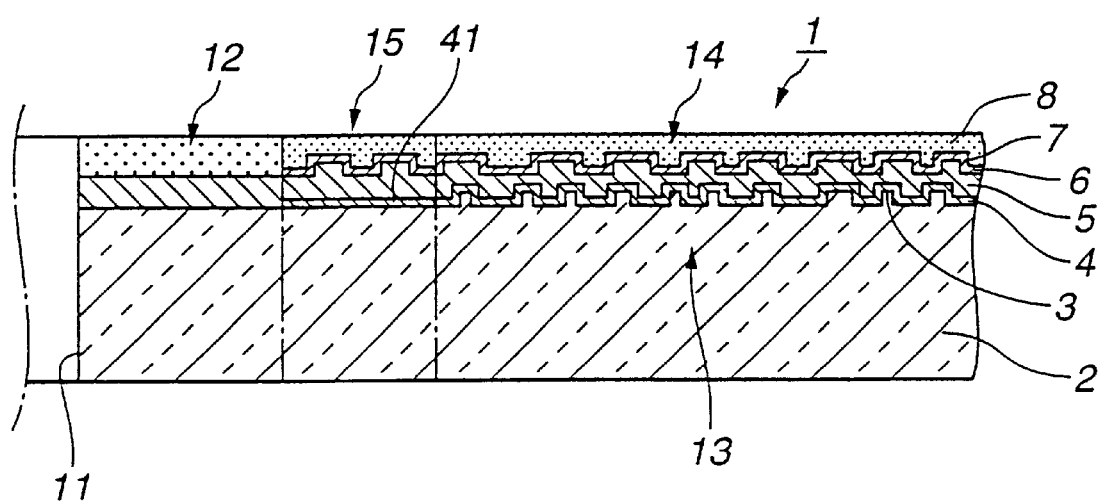
FIG. 12 is a cross-sectional view showing an example of an optical disc according to the present invention.

In the above-described optical disc 1, the first recording layer 4 is provided only radially outwardly of the lead-in area 15, without being provided in an area corresponding to the lead-in area 15 provided in the second recording layer 6. Alternatively, only the first recording layer 4 may be provided as a mirror surface 41 on one of the major surfaces of the flat substrate 2, as shown in FIG. 12. This mirror surface 41 is not provided with a pit pattern for control data.

By not recording data, such as control data, in the area in the second recording layer 6 corresponding to the lead-in area 15, the readout signals from the first recording layer 4 may be prohibited from being superposed on the readout signals of the lead-in area 15 provided in the second recording layer 6 to assure correct information readout.

In the optical disc according to the present invention, in which the lead-in area 15 having recorded therein data required in reading out the information is provided in the second recording layer 6, the information readout is started from the side second recording layer 6 provided with the lead-in area 15, thus readily controlling the readout start position of the information such as the audio information recorded in the first and second recording layers 4 and 6. By recording the data required in reading out the first information recorded in the first recording layer 4, the reflectance of the first recording layer 4, or data indicating the provision of the first recording layer 4, in the lead-in area 15, the gain of the servo loop or the playback amplifier on the side disc reproduction apparatus can readily be set depending on the disc type, specifically, depending on whether or not the optical disc is provided with the second recording layer 6, so that the desired information recorded on the first and second recording layers 4 and 6 can be reproduced readily.

By recording in the lead-in area 15 the discriminating information specifying the reproducing mode for the information recorded on the first and second recording layers 4 and 6, it is also possible to readily select the reproducing mode for the first and second information recorded in the first and second recording layers 4 and 6, that is to select whether the first and second information recorded in the first and second recording layers 4 and 6 is to be reproduced independently of each other or synthesized before reproduction.

Meanwhile, the discriminating signal need not be recorded in the lead-in area 15, but may also be recorded in one of the first and second recording layers 4 and 6 from which data readout occurs first when the playback is started on loading the optical disc 1. Alternatively, the discriminating information can be recorded in both of the first and second recording layers 4 and 6.

A reproducing device 50, configured for reproducing the optical disc according to the present invention, is hereinafter explained.

Figure 13:
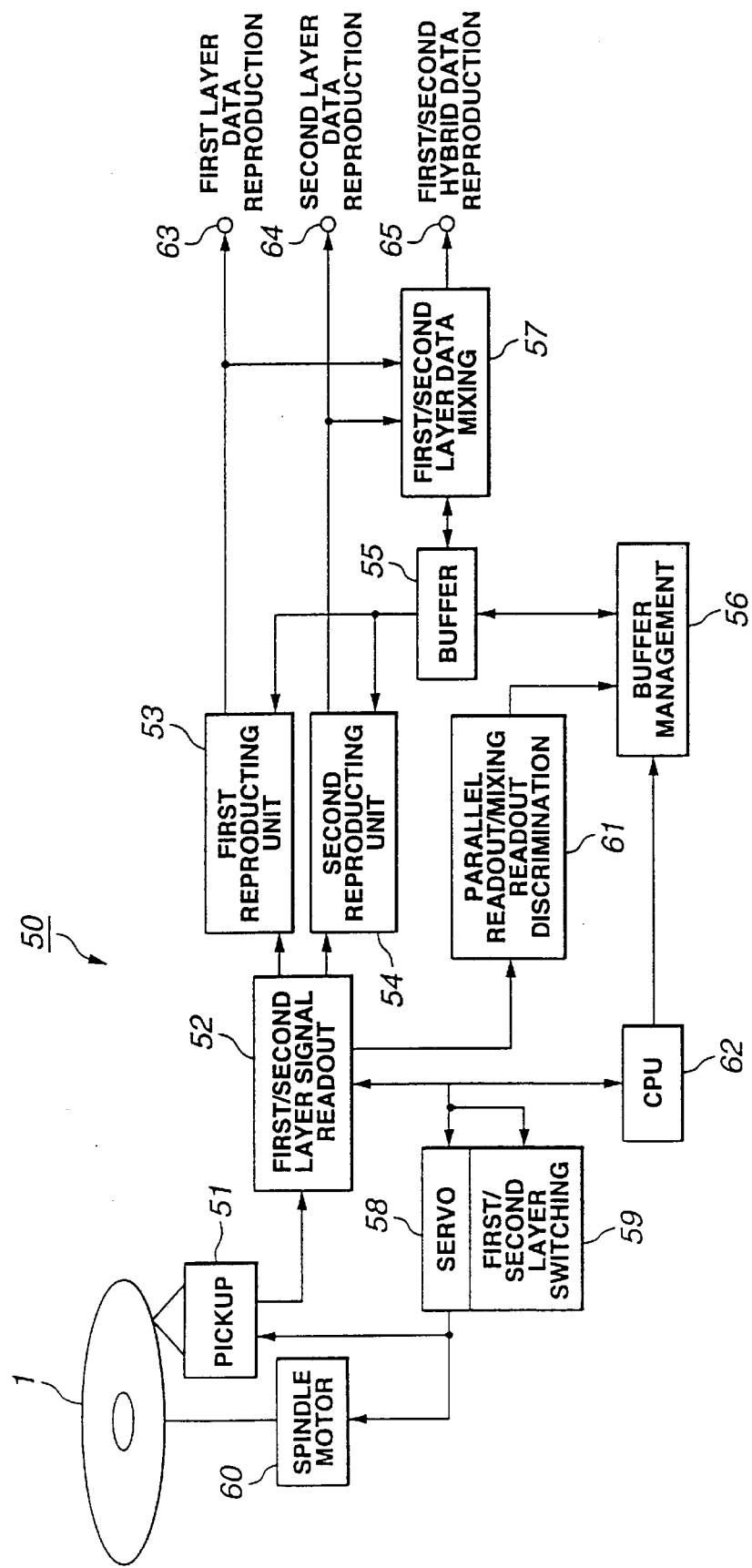
FIG. 13 is a block diagram showing a reproducing apparatus for reproducing an optical disc according to the present invention.

Referring to FIG. 13, the reproducing device 50 includes an optical pickup 51 and a signal readout portion 52, having an objective lens 18 for reading out the first and second information respectively recorded in the first and second recording layers 4 and 6 of the optical disc 1, a first reproducing unit 53 for reproducing the first information read out from the first recording layer 4, and a second reproducing unit 54 for reproducing the second information read out from the second recording layer 6. The reproducing device 50 also includes a buffer memory 55 for storing the first and second information reproduced from first and second reproducing units 53, 54, a buffer management unit 56 for supervising the writing and readout of the first and/or second information to or from the buffer memory 55, and a data mixer 57 constituting a reproducing unit for reproducing the first and second information stored in the buffer memory 55 after data processing such as addition or subtraction. The reproducing device 50 also includes a servo circuit 58 for transferring an optical pickup 51 to a target recording track of the optical disc 1. This servo circuit 58 is also provided with a switching unit 59 for switching the light beam radiated from the optical pickup 41 and converged by the objective lens 18 for focussing on the first and second recording layers 4 and 6, and a spindle motor 60 for rotating the optical disc 1 at e.g., a CLV under control by the servo circuit 58.

The reproducing device 50 is also provided with a parallel or mixing readout discriminating unit 61 for controlling the buffer management unit 56 which, responsive to the discriminating signal recorded in the lead-in area 15 for indicating the playback mode for the first and second information recorded in the first and second recording layers 4 and 6, selects between parallel playback and mixing playback. In the parallel playback, the first and second information recorded in the first and second recording layers 4 and 6 are sequentially read out in parallel, that is, the second information recorded in the second recording layer 6 is read out after reproducing the first information recorded in the first recording layer 4, or the first information recorded in the first recording layer 4 is read out after reproducing the second information recorded in the second recording layer 6. In the mixing playback, the first and second information recorded in the first and second recording layers 4 and 6 are mixed and calculated in the data mixer 57 to reproduce the mixed signal. The reproducing device 50 is also provided with a calculation processing unit (CPU) 62 which, responsive to a discriminating signal recorded on the optical disc or to a command from a user, determines whether the first and second information recorded on the first and second recording layers 4 and 6 of the optical disc 1 is selectively reproduced, the first and second information recorded on the first and second recording layers 4 and 6 are calculated and reproduced, or the optical disc such as the routine CD is reproduced. Based on the results of decision, the calculation processing unit (CPU) 62 controls the servo circuit 58, switching unit 59, signal readout portion 52 and the buffer management unit 56.

In the present reproducing device 50, the first and/or second information, read out from the first and/or second recording layers 4 and 6 of the optical disc 1 by the optical pickup 51, is routed to the signal readout portion 52. The optical pickup 51 causes movement of the focussing point, by moving the objective lens 18 along the optical axis of the objective lens 18, to focus the light beam on the first or second recording layer 4, 6 to scan the first or second recording layer 4, 6.

The signal readout portion 52 for reading out the information along with the optical pickup 51 applies pre-set signal processing, such as demodulation or error correction, to data supplied from the optical pickup 51, that is the first and second information read out from the first or second recording layer 4, 6, to route the resulting first and second information to the buffer memory 55.

The buffer memory 55 is a playback memory for the first and second information read out from the first and second recording layers 4 and 6, and has its data writing and readout controlled by the buffer management unit 56.

The operation of the reproducing device 50 shown in FIG. 13 is hereinafter explained.

When the optical disc is loaded on the reproducing device 50 and starts to be run in rotation, the optical pickup 51 is moved to the inner rim side of the optical disc 1 by a pickup feed unit, not shown, to read out the information recorded in the lead-in area 15. If the loaded optical disc 1 is such a one in which the respective independent first and second information are recorded in the first and second recording layers 4 and 6 thereof, and a discriminating signal indicating a first playback mode of reproducing the first and second information in parallel is recorded in its lead-in area 15, this discriminating signal is read out by the optical pickup 51 and the signal readout portion 52 and routed to the parallel or mixing readout discriminating unit 61. If the parallel or mixing readout discriminating unit 61 reads the discriminating signal indicating the reproduction of the first and second information in parallel, the parallel or mixing readout discriminating unit 61 controls the buffer management unit 56 to write in the buffer memory 55 the first or second information detected by the signal readout portion 52, processed in a pre-set manner for playback by the first and second reproducing units 53, 54 and recorded in the first or second recording layer 4, 6, at a pre-set timing, to read out the information from the buffer memory 55, to output the read-out information to the first or second reproducing unit 53, 54, to demodulate the outputted information in a demodulating circuit provided in the first and second reproducing units 53, 54 to correct the demodulated information in a demodulating circuit provided in the first and second reproducing units 53, 54 and to output the resulting information at a first output terminal 63 or a second output terminal 64. The first or second information, outputted by the first output terminal 63 or the second output terminal 64, is converted through an error interpolation unit, an LPF and a D/A converter into analog audio signals, which are outputted to an acoustic reproducing unit, such as a speaker.

If a playback mode selecting button, not shown, provided on the reproducing device 50, is operated by a user, and a command for reproducing the first information recorded on the first recording layer 4 of the optical disc 1 is inputted, the CPU 62 determines to reproduce the first information recorded on the first recording layer 4. If it is determined to reproduce the first information recorded on the first recording layer 4, the objective lens 18 of the optical pickup 51 has its focussing position controlled by the servo circuit 58 and the switching unit 59 to focus the light beam on the first recording layer 4 of the optical disc 1, run in rotation by the spindle motor 60, to scan the first recording layer 4. If the beam spot focussed by the objective lens 18 of the optical pickup 51 is controlled to scan the first recording layer 4, the return light beam reflected back only from the first recording layer 4 is routed to the signal readout portion 52 to detect only the first information recorded on the first recording layer 4. The first information recorded on the first recording layer 4 and detected by the signal readout unit 42 is processed for reproduction in a pre-set manner by the first reproducing unit 53 so as to be written in a pre-set timing in the buffer memory 55 under control by the buffer management unit 56. The first information then is demodulated by a demodulation circuit provided in the first reproducing unit 53 and is corrected for errors by an error correction circuit so as to be outputted at the first output terminal 62.

If a playback mode selecting button, not shown, provided in the reproducing device 50, is acted upon by a user, such that the playback mode of reproducing the second information recorded on the second recording layer 6 of the optical disc 1 is selected, the processing similar to that when the reproducing node of reproducing the first recording layer 4 is selected. That is, the second information recorded on the second recording layer 6 is read out and converted into analog audio signals which are outputted at the second recording layer 6.

If now the playback mode selecting button, not shown, provided in the reproducing device 50, is activated by the user, such that the playback mode of continuously reproducing the first and second information recorded on the first and second recording layers 4 and 6 is selected, the second information recorded on the second recording layer 6 is continuously reproduced in continuation to the reproduction of the first information recorded on the first recording layer 4. If the reproducing mode of reproducing the second information recorded on the second recording layer 6 first is selected, the first information recorded on the first recording layer 4 is carried out in continuation to the second information.

The first and second information, relevant to each other, are recorded in the first and second recording layers 4 and 6, respectively, and the optical disc 1, in the lead-in area 15 of which has been recorded a discriminating signal representing the second playback mode enabling calculation and reproduction of the first and second information, is loaded on the reproducing device 50. If now the selection button is acted on by the user as described above, to start the reproducing operation, the discriminating signal representing the second playback mode is read out by the optical pickup 51 and the signal readout portion 52 and sent to the parallel or mixing readout discriminating unit 61. When fed with the discriminating representing the second playback mode, the parallel or mixing readout discriminating unit 61 controls the buffer management unit 56. When fed with the discriminating signal representing the second playback mode, the buffer management unit 56 controls the buffer memory 55 to write the first and second information read out from the first and second recording layers 4 and 6 at a pre-set timing in the buffer memory 55 and to read out the information therefrom. At this time, the parallel or mixing readout discriminating unit 61 outputs a control signal to cause the data mixer 57 to process the first and second information read out from the buffer memory 55 with addition or subtraction.

If the user actuates a playback mode selection button, not shown, provided in the reproducing device 50, to select the playback mode of calculating and reproducing the first and second information, the reproduction is performed by the following operation: If the playback mode of calculating and reproducing the first and second information is selected, the CPU 62 constituting the control unit determines multiplex reproduction of calculating and reproducing the first and second information read out from the first and second recording layers 4 and 6 of the optical disc 1. If the multiplex reproduction is determined, the optical pickup 51 is controlled by the servo circuit 58 and the switching unit 59 so that the playback light beam will be focussed as the optical pickup is switched between the first recording layer 4 and the second recording layer 6. The switching timing of the light beam focussing point or the focussing position to the first or second recording layer 4, 6 is such that, when reproducing the first information recorded on the first recording layer 4 and subsequently reproducing the second information recorded in the second recording layer 6, reproduction of the second information recorded in the second recording layer 6 is started at a time point retrogressing from the playback end point of the first information on the first recording layer 4 on the time axis, and is continued to a time point subsequent to the playback end point of the first recording layer 4, after which the first recording layer 4 is reproduced again.

Figure 14A:
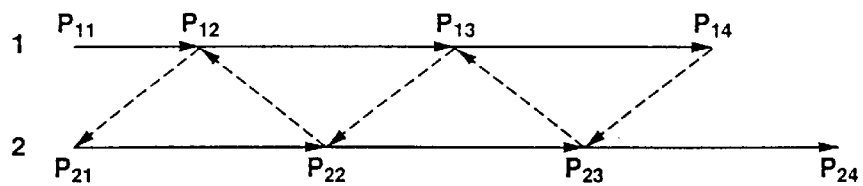
FIGS. 14a and 14b shows a switching timing in reproducing the first and second information recorded on the first and second recording layers of the optical disc by the reproducing apparatus shown in FIG. 13.

That is, if, after reproducing the first recording layer 4 from a position $P_{11}$ to a position $P_{12}$, the second recording layer 6 is to be reproduced, reproduction is started at a position $P_{21}$ which is temporally retrogressive to the playback end position $p_{12}$ of the first recording layer 4, as shown in FIG. 14a. The reproduction from the position $P_{12}$ of the first recording layer 4 is continued to a position $P_{13}$ which is more backward than the playback end position $P_{22}$ of the second recording layer 6. When reproduction is transferred to the second recording layer 6, reproduction reverts to a playback end position $P_{22}$ of the second recording layer 6 and continued to the position $P_{23}$ more backward than the playback end position $P_{13}$ of the first recording layer 4.

The first and second information, read out from the first and second recording layers 4 and 6 at the playback timing shown in FIG. 14a, are routed to the signal readout portion 52 so that the playback signal processing is performed in accordance with the aforementioned timing. When outputting the signals read out from the first or second recording layer 4, 6, the signal readout portion 52 outputs to the CPU 62 the discriminating signal prerecorded on the first and second recording layers 4 and 6 for representing the respective recording layers 4 and 6 to cause the CPU 62 to control the data writing or readout timing for the buffer memory 55 through the buffer management unit 56.

The data write timing for the buffer memory 55 is analogous to the playback timing shown in FIG. 14a or the readout timing in the signal readout portion 52. On the other hand, the data readout timing from the buffer memory 55 is such that data readout from the buffer memory 55 is started after storage of a pre-set quantity of the data in the buffer memory 55. Theoretically, the optical disc 1 is run in rotation at a speed not less than twice the prescribed standard speed to effect high-speed readout at a speed not less than a double speed to effect data writing in the buffer memory 55.

After writing a pre-set amount of the first and second information recorded on the first or second recording layer 4, 6 in the buffer memory 55, the first or second recording layer 4, 6 recorded on the first and second recording layers 4 and 6 is read out and outputted to the first or second reproducing unit 53, 54. The outputted information is demodulated by demodulating circuits provided in the first and second reproducing units 53, 54 and corrected for errors by an error correction circuit so as to be thence supplied to the data mixer 57. The first and second information inputted to the data mixer 57 are processed e.g., with addition so as to be outputted as playback signals at a third output terminal 64.

Meanwhile, if the first and second recording layers 4 and 6 are to be read at a standard speed prescribed in a standard, the information needs to be read out from the optical disc 1 at a double speed, that is at a speed twice the standard speed, even if the switching time of the playback timing of the first and second recording layers 4 and 6 is excluded, such that the spindle motor 60 needs to be rotated in reality at a speed not less than a speed four times the standard rotational speed.

Figure 14B:
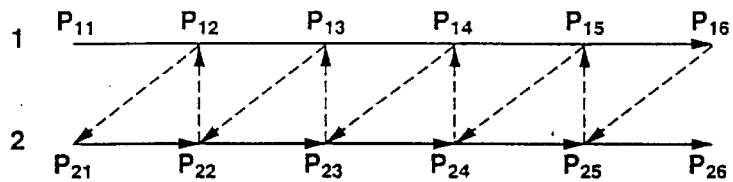

The switching timing for illuminating the playback light beam radiated from the optical pickup 5 1 as the light beam is switched between the first recording layer 4 and the second recording layer 6 may be such a timing shown for example, in FIG. 14b. That is, the first recording layer 4 is reproduced from a position $P_{11}$ to a position $P_{12}$ and, when the reproduction is transferred to the second recording layer 6, the reproduction is started at a point $P_{21}$ which is temporally retrogressive from the playback end position $P_{12}$ of the first recording layer 4. After reproduction to a position $P_{22}$ of the same timing as the playback end position $P_{12}$ of the first recording layer 4, reproduction is started as from the position $P_{12}$ of the first recording layer 4. The reproduction from the position $P_{12}$ of the first recording layer 4 is continued to a position $P_{13}$ temporally subsequent to the playback end point $P_{22}$ of the second recording layer 6. When the reproduction is transferred to the second recording layer 6, the reproduction reverts to the playback end position $p_{22}$ of the second recording layer 6 and is continued up to a position $P_{23}$ of the same timing as the playback end position $P_{13}$ of the first recording layer 4.

The signals read out from the first and second recording layers 4 and 6 at the playback timing shown in FIG. 14b are routed to the signal readout portion 52 so as to be subjected to playback signal processing as mentioned above.

It is noted that, if the multi-channel audio information, enabling surround reproduction, has been recorded in the first and second recording layers 4 and 6, left and right front channel data, inputted to the left and right front speakers 11, 12, arranged on the forward side of the acoustic space, are recorded in the second recording layer 6, and the left and right rear channel data inputted to the left and right rear speakers 13, 14 are recorded on the first recording layer 4, the first and second information are mixed together by the data mixer 57 so that audio data enabling 4-channel stereo reproduction is outputted by a third output terminal 65.

Meanwhile, if the first and second information, recorded on the first and second recording layers 4 and 6 of the optical disc 1 and which are relevant to each other to constitute unitary recording data, are recorded in a distance accessible within a range of the tracking control, which is the range within the field of view of the objective lens 18, with the sled feed of causing the movement of the optical pickup 51 in a direction perpendicular to the recording track by a pickup feed mechanism, not shown, that is, in a radial direction of the optical disc 1, not being performed, it is possible to reduce the amount of movement in the tracking direction of the optical pickup 51 to reproduce, calculate and output the first and second information sequentially. It is sufficient in this case if the terminal point of one of the first and second information and the beginning point of the other information are recorded within a distance accessible within the field of view of the objective lens 18.

If, when the upper 16 bits of quantization data of 32 bits are recorded as the second information in the second recording layer 6 of the optical disc 1, and lower 16 bits of the quantization data of the 32 bits are recorded in its first recording layer 4, the reproducing mode of adding the first and second information by the data mixer 57 as discussed above and outputting the resulting data is selected, it is possible for the reproducing device 50 to reproduce the high quality audio information in which the frequency range, for example, has been enlarged by the 32 bit quantizing data.

If the audio information is recorded as the second information, whilst text data, such as lyrics, relevant to this audio information, are recorded as the first information in the first recording layer 4, picture data as well as the audio information is reproduced to enable picture reproduction simultaneously with the audio information.

Moreover, if, when the audio information corresponding to the accompaniment music separated from a complete music number composed of a lyric and the accompaniment music is recorded in the first recording layer 4, and the audio data containing the entire musical number composed of the lyric and the accompaniment music is recorded as the second information in the second recording layer 6, the calculating operation of subtracting the first information from the second information is carried out in the data mixer 57, the audio information composed only of the lyric portion is outputted as the playback information at the third output terminal 65.

If, in the reproducing device 50 shown in FIG. 13, the optical disc loaded is the optical disc 1 in the first and second recording layers 4 and 6 of which are recorded the first and second information relevant to each other and from which can be processed and reproduced the first and second information, the playback mode of reproducing only the first or second information recorded in the first or second recording layer 4, 6 is selected by the user, the CPU 62 determines reproduction of the first or second information only from the first or second recording layer 4, 6, whilst the optical pickup 51 is controlled by the servo circuit 58 and the switching unit 59 so that the light beam converged by the objective lens 18 will be converged on the first or second recording layer 4, 6 of the optical pickup 1 rotated by the spindle motor 60 to scan only the first or second recording layer 4, 6. That is, the objective lens 18 is moved in a direction parallel to its optical axis so that the focussing point by the objective lens 18 is positioned in the first or second recording layer 4, 6. If the optical pickup 51 is controlled to scan the first or second recording layer 4, 6, a signal corresponding to detection by a photodetector of the optical pickup 51 of the return light beam reflected only from the first or second recording layer 4, 6 is supplied to the signal readout portion 52 to read out only the first or second information recorded on the first or second recording layer 4, 6. An output signal derived from the first or second information from the signal readout portion 52, recorded on the first or second recording layer 4, 6, is processed for playback in a pre-set manner and written in the buffer memory 55 at a pre-set timing based on management control of the buffer management unit 56. The output signal then is read out from the buffer management unit 56 and demodulated and corrected for errors by the first or second reproducing unit 53 or 54 so as to be outputted as playback output from the first or second output terminal 62 or 63.

Meanwhile, if, in the optical disc according to the present invention, the CD format is satisfied, such as by designing the optical disc 1 to have a reflectance enabling reproduction of at least the second recording layer 6 thereof by a routine CD reproducing device, as discussed above, at least the second information recorded on the second recording layer 6 can be reproduced by a reproducing device reproducing the routine CD.

Figure 15:
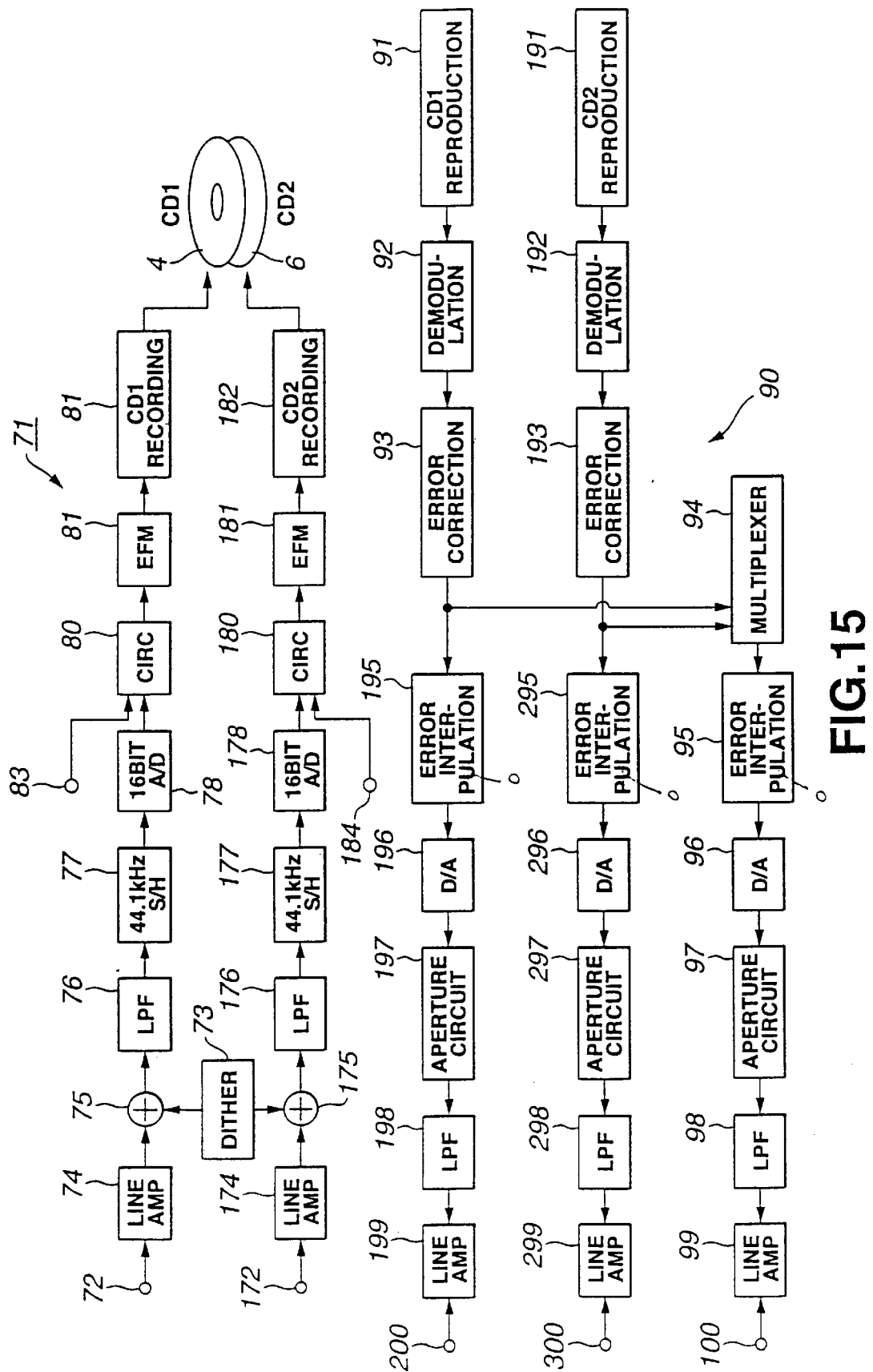
FIG. 15 is a block diagram showing a recording apparatus for recording the first and second information on the first and second recording layers of an optical disc and a reproducing apparatus for reproducing the first and second information recorded on the first and second recording layers by the recording apparatus.

Referring to FIG. 15, a recording apparatus 71 for recording the first and second information relevant to each other on the optical disc having the first and second recording layers 4 and 6 is explained with reference to FIG. 15.

The recording apparatus 71 includes a first input terminal 72, fed with first audio signals corresponding to the first information recorded on the first recording layer 4 of the optical disc 1, and a second input terminal 172, fed with second audio signals corresponding to the second information recorded on the second recording layer 6.

It is noted that the first and second audio signals, inputted to the first input terminal 72 and to the second input terminal 172, are mutually relevant analog audio signals which, on synthesis to each other, make up multi-channel audio signals enabling surround reproduction. That is, left and right front channel data and left and right rear channel data, making up a set of mutually relevant audio data of the front and rear four channels, and which are processed with the sampling at a sampling frequency of 44.1 kHz and quantization with 16 bits, may be said to be the data mutually relevant at the same time point on the time axis.

The first input terminal 72 is fed with first analog audio signals corresponding to left and right front channel data, whilst the second input terminal 172 is fed with second analog audio signals corresponding to left and right rear channel data.

The first audio signals, inputted to the first input terminal 72, are amplified by a first lineup 74 and thence supplied to a first adder 75 configured for adding dither which is the small random noise from a dither generating circuit 73. The first audio signal, to which the dither has been added in the first adder 75, is passed through a first low-pass filter (LPF) 76 where only signals having a band not higher than 20 kHz are taken out and routed to a first sampling circuit 77. The first sampling circuit then performs sampling on the filtered output of the first LPF 76 at a sampling frequency of 44.1 kHz. This sampling data is converted by a first A/D converter 78 into 16-bit digital audio signals.

Similarly, the second audio signals, inputted to the second input terminal 172, are amplified by a second lineup 174 and thence supplied to a second amplifier 175 adapted for summing the dither from the dither generating circuit 73. The second audio signals, added to with the dither from the second amplifier 175, are passed through a second low-pass filter (LPF) 176 where only signals having a band not higher than 20 kHz are taken out and routed to a second sampling circuit 177. The first sampling circuit then performs sampling on the filtered output of the second LPF 176 at a sampling frequency of 44.1 kHz. This sampling data is converted by a second A/D converter 178 into 16-bit digital audio signals.

The first digital audio signals, outputted by the first A/D converter 78 as 16-bit digital audio signals, derived from the first audio signals, are transiently written in a first buffer memory, read out therefrom and supplied to a first error correction encoding circuit 80 where it is subjected to encoding by the combination of the cross-interleaving employing the CIRC algorithm and the four-order Reed-Solomon codes. The encoded data outputted by the first error correction encoding circuit 80 is modulated by EFM by a first modulation circuit 81 and subjected to signal recording processing by a first recording processing circuit 82 so as to be recorded as the first information on the first recording layer 4 of the optical pickup of the recording apparatus.

On the other hand, the second digital audio signals, outputted by the second A/D converter 78 as 16-bit digital audio signals, derived from the second audio signals, are transiently written in a second buffer memory, read out therefrom and sent to a second error correction encoding circuit 180 where it is subjected to encoding by the combination of the cross-interleaving employing the CIRC algorithm and the four-order Reed-Solomon codes. The encoded data outputted by the second error correction encoding circuit 180 is modulated by EFM by a second modulation circuit 181 and subjected to signal recording processing by a second recording processing circuit 182 so as to be recorded as the second information in the first recording layer 6 of the optical pickup of the recording apparatus. In this second recording layer 6, there is recorded the lead-in area 15, as shown in FIG. 1. Thus, in the second recording layer 6, there are recorded, in addition to the aforementioned control data and the archival information for the second recording layer 6, discriminating signals indicating the playback mode of the first and second information. These control data and the discriminating information are supplied from a digital signal input terminal 184, as later explained, and are recorded by the optical pickup in the lead-in area 15 of the second recording layer 6 through the error correction encoding circuit 180, modulation circuit 181 and the recording processing circuit 182.

It is noted that the first digital data, recorded in the first recording layer 4, and the second digital data, recorded on the second recording layer 6, are recorded so that the data will be coincident with each other on the time axes.

The left and right front channel data, derived from the first audio signals, and the left and right rear channel data, derived from the second audio signals, may be recorded in the second recording layer 6 and in the first recording layer 4, respectively.

In the present recording apparatus 71, first and second digital signal input terminals 83, 184 may be provided in the first and second error correction encoding circuits 80, 180, so that the first and second information recorded in the first and second recording layers 4 and 6 may be directly inputted to the first and second error correction encoding circuits 80, 180.

As another mutually relevant information, recorded in the first and second recording layers 4 and 6, there is the combination of the audio information corresponding to the accompaniment music separated from a complete musical numbers composed of the lyric and the accompaniment music and the audio information comprising the totality of the musical number composed of the lyric and the accompaniment music.

The recording apparatus 71 records a discriminating signal indicating the playback mode in the lead-in area 15 of the optical disc 1 after or before recording the first and second information in the first and second recording layers 4 and 6.

The optical disc 1, in the first and second recording layers 4 and 6 of which have been recorded the mutually relevant information, as described above, is reproduced by a reproduced apparatus 90 shown in FIG. 15.

This reproducing apparatus 90 includes an optical pickup having an objective lens. The light beam for playback, converged by an objective lens, is selectively focussed in the first or second recording layer 4, 6, and the return light beam reflected from the first or second recording layer 4, 6 is detected by a photodetector to reproduce the first and second information recorded on the first and second recording layers 4 and 6.

The reproducing apparatus 70 sequentially sends a signal corresponding to the return light beam reflected by the first recording layer 4 of the optical disc rotationally driven at e.g., a CLV by a rotating driving unit, not shown, as detected by the optical pickup, to a first reproducing unit 91, a first demodulating circuit 92 and a second error correction circuit 93, together making up a playback signal processing unit. The first reproducing unit 91 RF-processes a detection signal from the optical pickup to generate RF signals which then are routed to the first demodulating circuit 92. The first demodulating circuit EFM-demodulates the RF signals, as an example, to route the demodulated signal to a first error correction circuit 93.

Similiar to the signal read out from the first recording layer 4, the signal corresponding to the return light beam reflected by the second recording layer 6 of the optical disc 1, as detected by the optical pickup, is sequentially routed to a second reproducing unit 191, a second demodulating circuit 192 and to a second error correction circuit 193. The second reproducing unit 191 RF-processes a detection signal from the optical pickup to generate RF signals which then are routed to the second demodulating circuit 192. The first demodulating circuit EFM-demodulates the RF signals, as an example, to route the demodulated signal to a second error correction circuit 193.

Meanwhile, the reproducing apparatus 90 is provided with a playback mode selection button, not shown. This playback mode selection button selects the first and second information respectively recorded in the first and second recording layers 4 and 6 of the optical disc 1.

Outputs of the first and second error correction circuits 93, 193 are issued depending on-the selected playback mode. If the playback mode selection button is activated, such that a reproducing mode corresponding to a discriminating signal pre-recorded on the optical disc 1, that is the playback mode of calculating and reproducing the first and second information, is selected, the first and second information, read out from the first and second recording layers 4 and 6, are routed to a multiplexer 94. The multiplexer 94, fed with the first and second information read out from the first and second recording layers 4 and 6, performs calculating operations, such as addition or subtraction, on the first information read out from the first recording layer 4 and the second information read out from the second recording layer 6, in accordance with discriminating signals pre-recorded on the optical disc 1, to output the resulting information as playback signals.

For example, if the left and right front channel data, corresponding to the first audio signals, are recorded in the first recording layer 4, and the left and right rear channel data, corresponding to the second audio signals, are recorded as the second information in the second recording layer 6, the multiplexer 94 sums the first and second information, read out from the first and second recording layers 4 and 6, to output the resulting sum information.

The audio data, processed by the multiplexer 94, is sent to a first error interpolation circuit 95, where it is decoded by e.g., CIRC and sent to a first D/A converter 96 for conversion to analog audio signals. These analog audio signals are routed from a first aperture circuit 97 to a first low-pass filter (LPF) 98. This first LPF 98 filters the analog audio signals, with a cut-off frequency of approximately 20 kHz, to output the resulting filtered signal via a first amplifier 99 from a first output terminal 100. By interconnecting an acoustic reproducing apparatus, such as a speaker unit or a headphone unit, to the first output terminal 100, sound reproduction based on audio data corresponding to the first information read out from the first recording layer 4 and the second information read out from the second recording layer 6 is achieved.

If, when the audio information corresponding to the accompaniment music, separated from a complete musical number composed of the lyric and the accompaniment music for this lyric, is recorded as the first information, and the audio information corresponding to the lyric of this complete musical number is recorded as the second information in the second recording layer 6, a discriminating signal has been recorded as a signal indicating addition of the first and second information read out from the first and second recording layers 4 and 6, the multiplexer 94 outputs a sum signal of the first and second information read out from the first and second recording layers 4 and 6 as a playback signal. This summed audio data is audio data of a complete musical number composed of the first information corresponding to the accompaniment music recorded in the first recording layer 4 and the second information corresponding to the lyric recorded on the second recording layer 6.

If, when the audio information corresponding to the accompaniment music, separated from a complete musical number composed of the lyric and the accompaniment music for this lyric, is recorded as the first information, and the audio information corresponding to the lyric of this complete musical number is recorded as the second information in the second recording layer 6, a discriminating signal has been recorded as a signal indicating subtraction of the second information read out from the second recording layer 6 from the first information read out from the first recording layer 4, the multiplexer 94 outputs a difference signal obtained on subtracting the second information read out from the second recording layer 6 from the first information read out from the first recording layer 4 as a playback signal. This difference audio data is audio data containing only the audio information corresponding to the accompaniment music of the lyric.

If the playback mode selecting button is activated select the playback mode of respectively independently outputting the first and second information read out from the first and second recording layers 4 and 6 of the optical disc 1, the first and second information read out from the first and second recording layers 4 and 6 are demodulated by the first and second demodulating circuits 92, 193 and routed through the first and second error correction circuits 93, 193 to second and third error interpolation circuits 195, 295, where the first and second information are decoded by e.g., CIRC and routed to second and third D/A converters 196, 296 for conversion to analog audio signals. These analog audio signals are routed from second and third aperture circuits 197, 297 to second and third LPFs 198, 298 where the analog audio signals are filtered at a cut-off frequency of approximately 20 kHz and outputted through second and third amplifiers 199,299 at second and third output terminals 200, 300. By connecting acoustic reproducing apparatus, such as a speaker device or a headphone device, to the second and third output terminals 200, 300, acoustic reproduction is realized on the basis of the audio data read out from the first and second recording layers 4 and 6. By selecting signals outputted from the second or third output terminal 200 or 300, the first or second information, recorded on the first or second recording layer 4, 6, can be selectively reproduced and heard.

Although the recording medium in the above-described embodiment is an optical disc, it may also be card type memories, such as an optical card or a semiconductor memory, a hard disc or a magnetic disc, without being limited to the optical disc, on the condition that a reproducing apparatus adapted to the recording medium to be used is employed.

What is claimed is:

1. A recording medium having at least a first recording layer for recording first information and a second recording layer for recording second information, wherein:
   a discriminating signal indicating a playback mode is recorded on at least one of said first and said second recording layers; and
   upper bits of audio data are recorded as said first information in said first recording layer and lower bits of said audio data are recorded as said second information in said second recording layer.

2. The recording medium according to claim 1 wherein:
   said discriminating signal indicates a first playback mode for respectively reproducing said first information recorded on said first recording layer and said second information recorded on said second recording layer and a second playback mode for calculating said first information recorded on said first recording layer and said second information recorded on said second recording layer to generate playback signals.

3. The recording medium according to claim 1 wherein:
   there is provided in at least one of said first and said second recording layers an archival information area on which there is recorded archival information for the information recorded on said recording layer; and
   said discriminating signal is recorded in said archival information area.

4. The recording medium according to claim 3 wherein
   said archival information is recorded in a portion of one of said first recording layer and the second recording layer extending in a direction parallel to the other of said first and second recording layers such that the other recording layer does not interfere with the portion having the archival information.

5. The recording medium according to claim 4 wherein:
   the portion of said other recording layer facing said one recording layer is formed as a flat surface such that the other recording layer does not interfere with reading the archival information on the one recording layer.

6. The recording medium according to claim 1 wherein:
   said reproducing mode indicates how said first information recorded in said first recording layer and said second information recorded in said second recording layer are to be read out.

7. The recording medium according to claim 1 wherein:
   audio data is recorded as said first information in said first recording layer and data pertinent to said audio data is recorded as said second information in said second recording layer.

8. A recording medium comprising:
   a first recording layer for recording at least first information and a second recording layer for recording second information,
   wherein a discriminating signal indicating the playback mode is recorded in one of said first recording layer and said second recording layer and is readout first in reproduction; and
   upper bits of audio data are recorded as said first information in said first recording layer and lower bits of said audio data are recorded as said second information in said second recording layer.

9. The recording medium according to claim 8 wherein:
   said discriminating signal indicates a first playback mode for respectively reproducing said first information recorded in said first recording layer and said second information recorded in said second recording layer and a second playback mode for calculating said first information recorded in said first recording layer and said second information recorded in said second recording layer to generate playback signals.

10. The recording medium according to claim 8 wherein:
    said discriminating signal is recorded in an archival information area provided in a recording layer read out in reproduction and on which is recorded the archival information.

11. The recording medium according to claim 10 wherein:
    said archival information is recorded on a portion of one of said first recording layer and said second recording layer extending in a direction parallel to the other of the first and second recording layers such that the other recording layer does not interfere with the portion having said archival information.

12. The recording medium according to claim 11 wherein
    the portion of said other recording layer facing said one recording layer is formed as a flat surface such that the other recording layer does not interfere with reading the archival information on the one recording layer.

13. The recording medium according to claim 8 wherein:
    said reproducing mode indicates how the first information recorded in said first recording layer and the second information recorded in said second recording layer are to be read out.

14. The recording medium according to claim 8 wherein:
    audio data is recorded as said first information in said first recording layer and data pertinent to said audio data is recorded as said second information in said second recording layer.

15. A reproducing apparatus for reproducing a recording medium at least having a first recording layer for recording first information and a second recording layer for recording second information, in which there is recorded, in at least one of said first recording layer and said second recording layer, a discriminating signal at least indicating whether said first information recorded in said first recording layer and said second information recorded in said second recording layer are to be processed and reproduced, said reproducing apparatus comprising:
    readout means for reading out said first information including upper bits of audio data recorded in said first information and said second information including lower bits of audio data recorded in said second information from said recording medium;
    reproducing processing means for performing signal processing on an output signal of said readout means; and
    control means for switching said reproducing processing means based on a discriminating signal read out by said readout means.

16. The reproducing apparatus according to claim 15 wherein:
    said reproducing processing means includes calculation processing means for calculating said first information and said second information readout by said readout means based on a control signal from said control means to output resulting information.

17. The reproducing apparatus according to claim 16 wherein said calculation processing means includes a buffer memory in which is written one of said first information and said second information read out by said readout means and a calculating unit for performing calculations on other information read out by said readout means and information read out from said buffer memory.

18. The reproducing apparatus according to claim 15 wherein:

said control means controls said reproducing processing means to perform calculations on said first information recorded in said first recording layer and said second information recorded in said second recording layer when said discriminating signal indicates performing calculations on said first information and said second information and for reproducing the resulting information.

19. The reproducing apparatus according to claim 18 wherein:

said control means controls said reproducing processing means to output said first information recorded in said first recording layer and said second information recorded in said second recording layer and read out by said readout means when said discriminating signal does not indicate performing calculations on said first information and said second information.

20. A reproducing method for reproducing a recording medium having at least a first recording layer for recording first information and a second recording layer for recording second information, in which there is recorded, in at least one of said first recording layer and said second recording layer, a discriminating signal at least indicating whether said first information recorded in said first recording layer and said second information recorded in said second recording layer are to be processed and reproduced, said reproducing method comprising the steps of:

reading out one of said first information including upper bits of audio data recorded in said first information and said second information including lower bits of audio data recorded in said second information from said recording medium; and activating a reproducing processing operation of a reproducing processing means supplied with the first and second information read out from said recording medium based on the discriminating signal read out from said recording medium.

21. The reproducing method according to claim 20 wherein said reproducing processing means performs calculations on said first information recorded in said first recording layer and said second information recorded in second recording layer when said discriminating signal indicates performing calculations on said first information and said second information and outputting processed first and second information as playback signals.

22. The reproducing method according to claim 21 wherein said reproducing processing means outputs said first information recorded in said first recording layer and said second information recorded in said second recording layer when said discriminating signal does not indicate performing calculations on and reproducing said first information and said second information.

23. An optical recording medium having a first recording layer for recording first audio information and a second recording layer separated from said first recording layer by an intermediate layer for recording second audio information wherein said first audio information is related to said second audio information, said optical recording medium being adapted to be read by an optical head mounted on a sled feed, said first audio information being recorded at a location on said first recording layer in a vicinity of a location of said second audio information that is recorded on said second recording layer so as to permit access to said first audio information by movement within the field of view of an objective lens used for reading out said first and second audio information but without any movement of the sled feed, wherein upper bits of audio data are recorded as said first audio information in said first recording layer and lower bits of said audio data are recorded as said second audio information in said second recording layer.

24. The optical recording medium according to claim 23 wherein a start position, of an area of said first recording layer where said first audio information is recorded and a start position of an area of said second recording layer where said second audio information is recorded are within a range accessible by movement within said field of view of said objective lens but without any movement of the sled feed.

25. The optical recording medium according to claim 24 in which a discriminating signal indicating a reproducing mode is recorded in at least one of said first recording layer and said second recording layer.

26. The optical recording medium according to claim 24 wherein a discriminating signal indicates the first reproducing mode of respectively reproducing said first information recorded in said first recording layer and said second information recorded in said second recording layer and the second reproducing mode of performing calculations on said first information recorded in said first recording layer and the second information recorded in said second recording layer to generate playback signals.

27. The optical recording medium according to claim 25 wherein there is provided an archival information area on at least one of said first recording layer and said second recording layer, said archival information area having recorded thereon the archival information of the information recorded in said recording layer, and said archival information area having recorded thereon said discriminating signal.

28. The optical recording medium according to claim 27 wherein said archival information is recorded on a portion of one of said first recording layer and said second recording layer extending in a direction parallel to the other of the first and second recording layers such that the other recording layer does not interfere with the portion having the archival information.

29. The recording medium according to claim 28 wherein the portion of said other recording layer facing said one recording layer is formed as a flat surface such that the other recording layer does not interfere with reading the archival information.

30. The recording medium according to claim 25 wherein said reproducing mode indicates how said first audio information recorded in said first recording layer and said second audio information recorded in said second recording layer are to be read out.

31. The recording medium according to claim 23 wherein:

audio data is recorded as said first audio information in said first recording layer and data pertinent to said audio data is recorded as said second audio information in said second recording layer.

* * * * *